W. E. KING.
HYDRAULIC SWIVEL.
APPLICATION FILED JULY 16, 1920.

1,379,190.

Patented May 24, 1921.

INVENTOR.
Walter E. King
BY
Hardway & Cotting
ATTORNEYS.

UNITED STATES PATENT OFFICE.

WALTER E. KING, OF HOUSTON, TEXAS.

HYDRAULIC SWIVEL.

1,379,190.   Specification of Letters Patent.   Patented May 24, 1921.

Application filed July 16, 1920. Serial No. 396,681.

*To all whom it may concern:*

Be it known that I, WALTER E. KING, a citizen of the United States, residing at Houston, in the county of Harris and State of Texas, have invented certain new and useful Improvements in a Hydraulic Swivel, of which the following is a specification.

This invention relates to new and useful improvements in a hydraulic swivel.

One object of the invention is to provide a swivel of the character described which is adapted to be used in well drilling, by the rotary process, through which water may be forced, by means of a suitable pump, through the drill stem, down to the bottom of the bore for flushing the same.

Another object of the invention is to provide a hydraulic swivel having a water inlet through the side of the casing, through which the water is delivered into the swivel stem and thence into the drill stem.

A further feature of the invention resides in the provision of a swivel of the character described which is composed of few parts so arranged that only a small amount of packing will be required to prevent leakage through the joints.

With the above and other objects in view the invention has particular relation to certain novel features of construction, arrangement of parts and use, an example of which is given in this specification and illustrated in the accompanying drawings, wherein:—

Figures 1, 2:
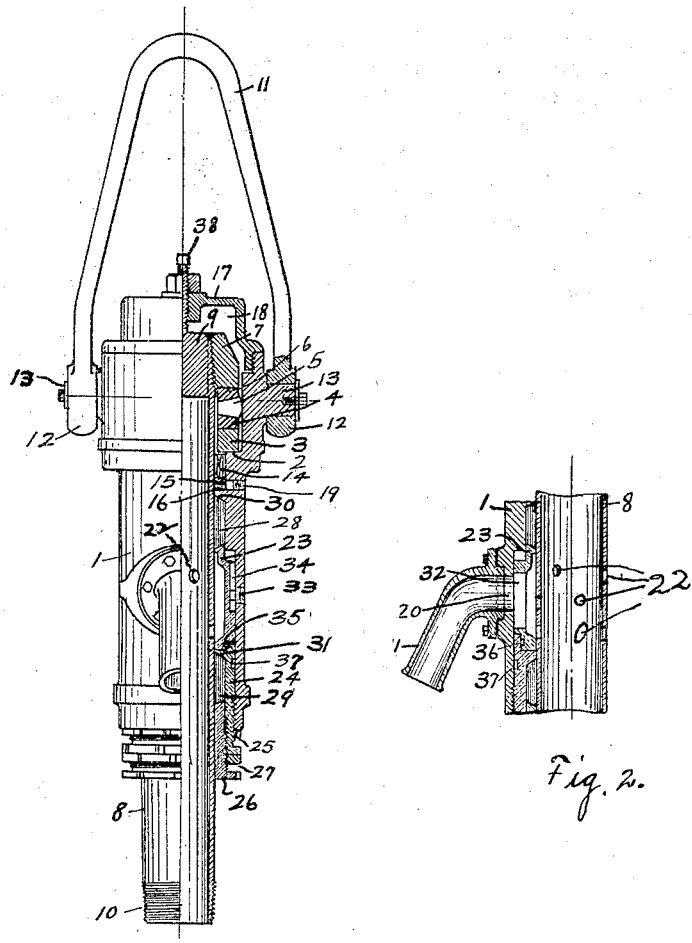
Figure 1 is a side elevation of the swivel, partially in section.
Fig. 2 is a fragmentary vertical sectional view.

Referring now more particularly to the drawings, wherein like numerals of reference designate similar parts in each of the figures, the numeral 1 refers to the tubular casing, the upper end of which is enlarged, forming an internal annular shoulder 2 whereon the annular ring support 3 rests. Mounted on this support, there is an annular ring 4 which in turn supports the conical bearings 5, and upon these bearings, there is an annular bearing ring 6 which carries the collar 7, which is threaded upon the upper end of the swivel stem 8. This stem is fitted through the casing and its upper end is formed with a solid head 9. The lower end 10 of the swivel stem is externally threaded to receive the upper joint of the drill stem (not shown). The swivel is supported from the top of the derrick by means of the bail 11, which is formed with the bearings 12, 12, through which the lateral studs 13, 13, formed integrally with the upper end of the casing, project. The anti-friction bearings 5 sustain the weight of the drill stem, and beneath the annular support 3 there are the roller bearings 14, which are interposed between the swivel stem and the casing, and which receive the side thrust of said stem. These bearings are supported upon an annular steel ring 15 underneath which is a packing ring 16. Inclosing the upper end of the casing, there is a cap 17 which is screwed into said casing, forming a chamber 18, which is kept filled with a lubricant which lubricates said bearings, and a plug 19 is threaded into the casing at the lower end of said chamber which may be removed for the purpose of draining and cleaning out said chamber preparatory to refilling it. At one side the casing is formed with an inlet opening 20, and secured to the casing in alinement with this opening, there is an inlet hose connection 21 to which the hose leading from the pump (not shown) may be attached. The section of the swivel stem 8, opposite the opening 20, is provided with perforations 22 through which water is admitted from the hose connection, into the swivel stem, said water passing on down through said stem and through the drill stem to the bottom of the bore.

Inserted within the casing from beneath and surrounding the swivel stem, there is a sectional gland composed of the upper and lower sections 23 and 24. The section 24 is threaded into the lower end of the casing and carries a lock nut 25, which locks tightly against the lower end of the casing, to form a tight joint, and closely surrounding the swivel stem, there is the lower gland 26, which is screwed up into the section 24, and which carries a lock ring 27, which is threaded thereon and abuts against the lower end of said section. Upper and lower packing rings 28 and 29 are provided to surround the swivel stem above and below the perforations 22. The former is clamped between the upper end of the section 23, and the internal annular shoulder 30 of the casing and the lower packing ring is clamped between the gland 26, and the internal annular shoulder 31 of the section 24. The section 23 of the upper gland is formed with an opening 32, alined with the opening 20, through which the water passes and this section is prevented from rotating, so as to hold said openings in alinement, by means of the key 33, which is screwed into the casing and whose inner end projects into a vertical keyway 34 cut in the section 23. The sections 23 and 24 are anchored together by means of suitable pins 35, which pass through the upper end of the section 24 and project into an annular grove 36 around the lower end of the section 23. These sections are anchored together so that when the lower one is withdrawn the upper one will be withdrawn with it. The joints between the parts are made water-tight by means of suitable packing rings or gaskets as 37, so as to minimize the leakage.

When it is desired to break up the drill stem, withdrawing it from the bore, this swivel is detached and let down on the derrick floor, the lower end of the swivel stem resting upon said floor, and in order to hold said stem in place, an adjusting screw 38 is threaded through the cap 17 against the upper end of said stem, and this screw prevents the displacement of said stem, and may also be screwed down to compensate for wear in the bearings and rings.

What I claim is:—

1. A hydraulic swivel including a casing having a side opening, a hose connection secured to the side of the casing, and in alinement with said opening, a swivel stem whose upper end is closed rotatably mounted within the casing and perforated opposite said opening, bearings sustaining said stem within said casing, glands fitted within the lower end of the casing around said stem, and packing rings surrounding the stem within the casing, above and below said perforations, said rings being held in position by said glands.

2. A hydraulic swivel including a tubular casing, a swivel stem rotatably mounted within the casing and having its upper end closed, a section of said stem being perforated, a water inlet entering the side of the casing opposite said perforations through which water may be admitted into the stem, packing rings surrounding the stem within the casing and located above and below said perforations, respectively, and glands fitted into the lower end of the casing around the stem which clamp against and hold said packing rings in place.

In testimony whereof I have signed my name to this specification in the presence of two subscribing witnesses.

WALTER E. KING.

Witnesses:
Wm. A. Cathey,
E. V. Hardway.